Sept. 19, 1939.     R. T. OSMAN     2,173,441
DUMP VEHICLE
Filed Feb. 14, 1936     3 Sheets-Sheet 1

INVENTOR
RALPH T. OSMAN.
BY
ATTORNEYS

Sept. 19, 1939.　　　R. T. OSMAN　　　2,173,441
DUMP VEHICLE
Filed Feb. 14, 1936　　　3 Sheets-Sheet 2

INVENTOR
RALPH T. OSMAN.
BY 
ATTORNEYS

Sept. 19, 1939.    R. T. OSMAN    2,173,441
DUMP VEHICLE
Filed Feb. 14, 1936    3 Sheets-Sheet 3

INVENTOR
RALPH T. OSMAN.
BY
ATTORNEYS

Patented Sept. 19, 1939

2,173,441

UNITED STATES PATENT OFFICE 2,173,441

DUMP VEHICLE

Ralph T. Osman, Milwaukee, Wis.

Application February 14, 1936, Serial No. 63,886

17 Claims. (Cl. 298—35)

This invention appertains to dump vehicles, such as wagons, trucks, trailers and the like, having downwardly opening bottom doors or gates by means of which the load is precipitated from the body of the vehicle.

One of the primary objects of my invention is to provide novel means for closing the bottom doors after the load has been dumped, and for holding the doors in their closed position during the receiving of the load and the traveling of the vehicle.

Another salient object of my invention is the provision of automatic means for closing the dump doors of a vehicle by the travel of the vehicle as the same moves away from the dumped load, with means under the control of the operator for permitting the opening of the doors under influence of the carried load.

A further object of my invention is to provide means for automatically rendering the door-closing means inoperative after the doors have been moved to their fully closed position, whereby danger of breakage of parts is eliminated.

A further important object of my invention is the provision of manually operated means for resetting the automatic door-closing means back to its normal operating position when it is again desired to close the doors after the dumping of a load.

A still further object of my invention is the provision of automatic door-closing mechanism of the above character, which will be durable and efficient in use, one that will be simple and easy to manufacture, and one which can be incorporated with a substantially ordinary type of dump vehicle.

With these and other objects in view, the invention consists in the novel construction, arrangement, and formation of parts, as will be hereinafter more specifically described, claimed, and illustrated in the accompanying drawings, in which drawings:

Figure 1:
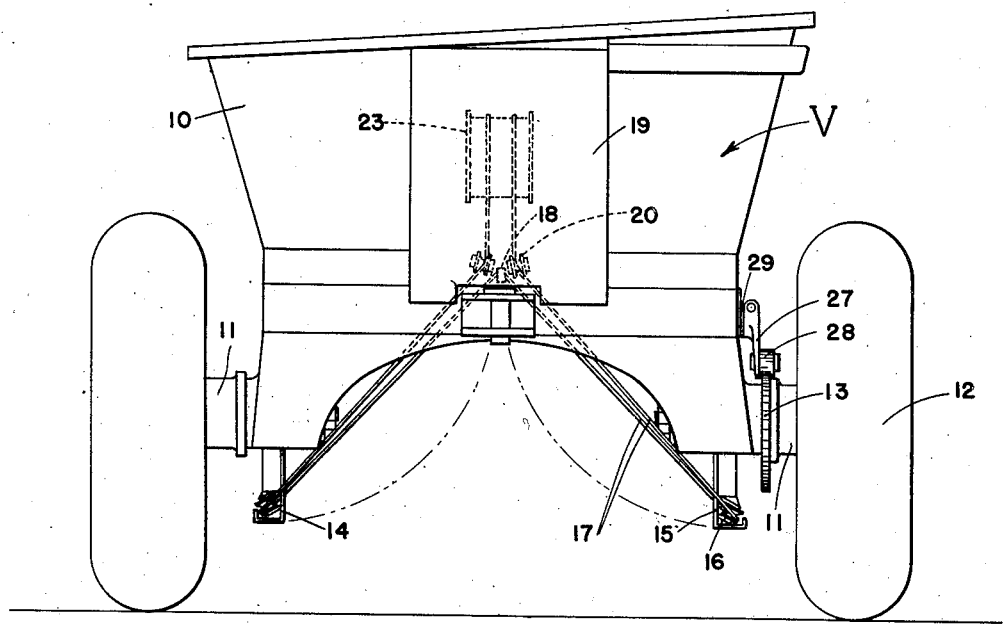
Figure 1 is a rear elevation of a dump vehicle having my improved appliance incorporated therewith.
Figure 2:
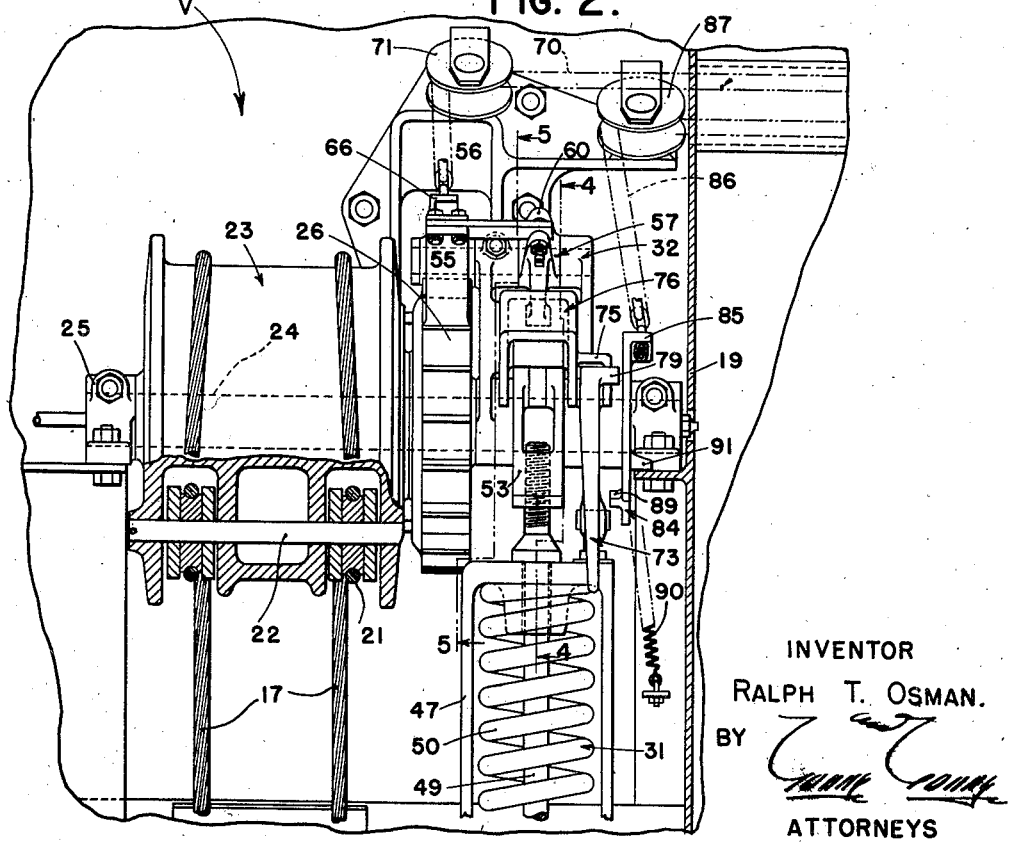
Figure 2 is an enlarged, fragmentary rear elevation of a part of the improved operating mechanism, with certain parts shown broken away and in section.
Figure 3:
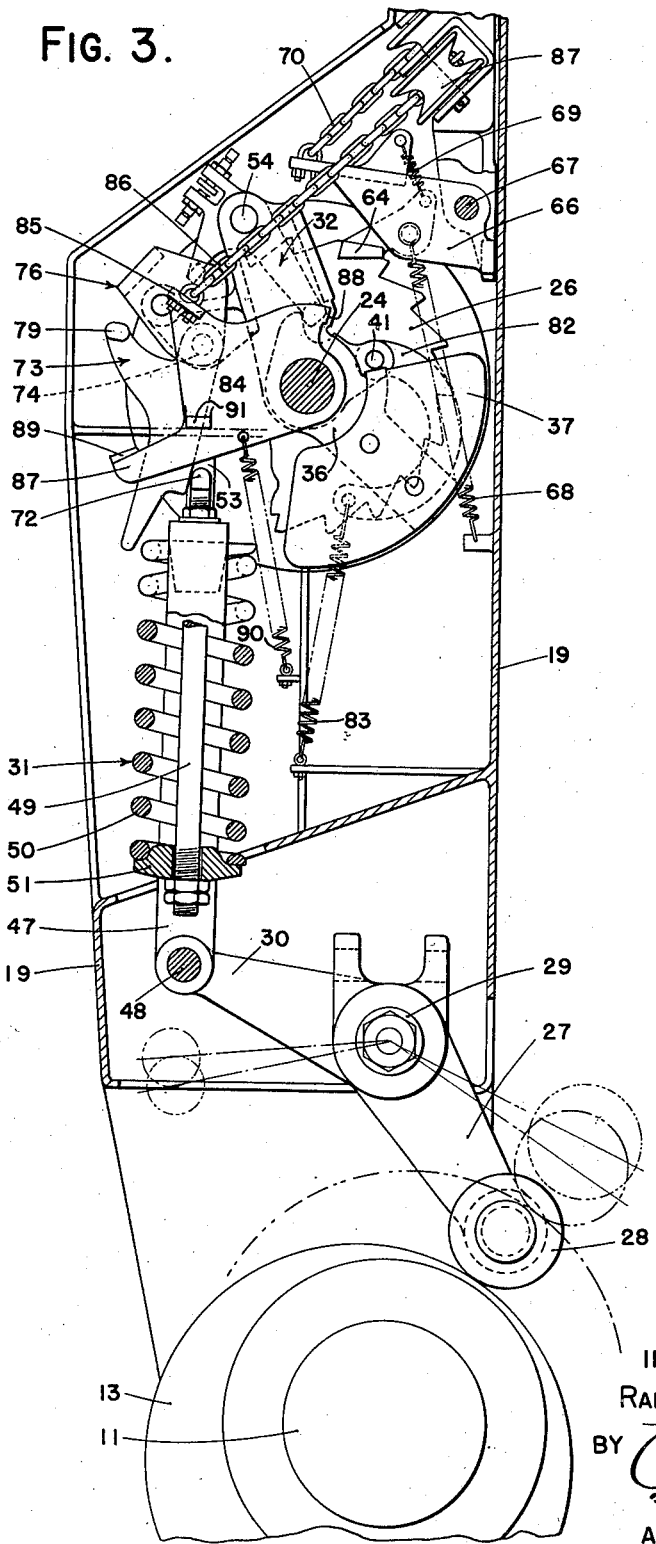
Figure 3 is a side elevation of the operating mechanism, with parts thereof broken away and in section, the parts being shown in full lines in their operative position and for closing the dump doors.
Figure 3:
Figure 4:
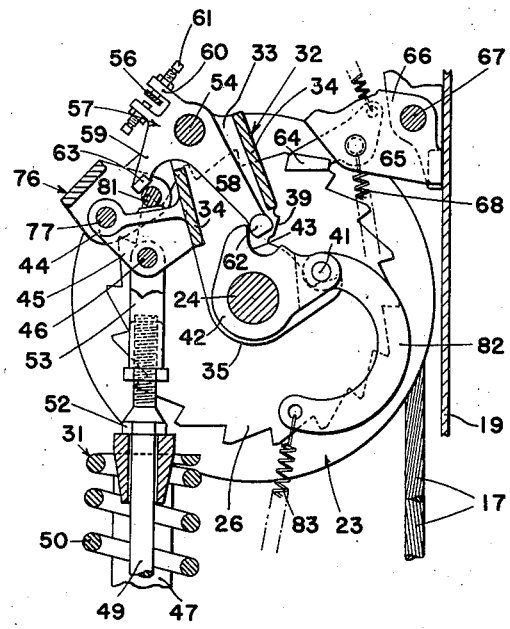
Figure 4 is a fragmentary transverse section taken substantially on the line 4—4 of Figure 2, with the parts in their position ready for closing the dump doors.
Figure 5:
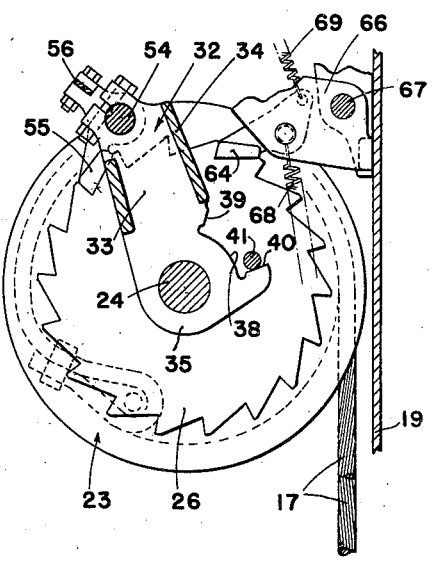
Figure 5 is a view similar to Figure 4, the view being taken substantially on the line 5—5 of Figure 2.
Figure 6:
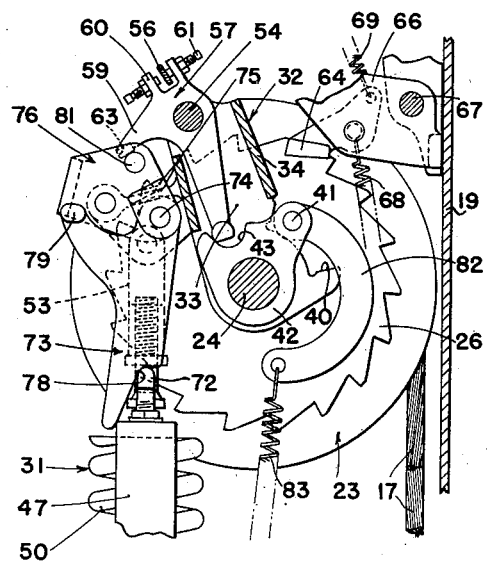
Figure 6 is a transverse section taken substantially on the line 6—6 of Figure 2, showing the position of the parts after the dump doors have been moved to their closed position.

Referring to the drawings in detail, wherein similar reference characters designate corresponding parts throughout the several views, the letter V generally indicates a dump vehicle, which can be of any preferred character or make, but, as illustrated, the same includes the dump body 10 having rear axles 11 on which are mounted for movement therewith ground wheels 12. One of the axles has rigidly secured thereto an operating cam 13, which forms a part of my improved mechanism. Obviously, the axles 11 can be rigidly secured to the chassis of the vehicle, and the wheels can be rotatably mounted on the axles, in which case the cam 13 is rigidly secured to one wheel 12 in any preferred manner.

The body 10 of the dump vehicle V has its bottom open, and this open bottom is normally closed by doors or gates 14 and 15. The doors are pivoted at their outer longitudinal edges to the sides of the dump body, and when the doors are in their closed position, the inner longitudinal edges of the doors meet to form a complete bottom closure.

In accordance with my invention, the opposite ends of the doors 14 and 15 at their inner longitudinal edges, are provided with guide pulleys 16, around which are trained pull cables 17. These cables extend longitudinally of the doors and have their forward terminals rigidly secured to the front end of the dump vehicle in any preferred manner, as indicated by the reference character 18. The rear terminals of the cables are extended into a housing 19 carried by the rear wall of the truck body and are trained over guide pulleys 20 mounted therein.

After the cables leave the guide pulleys, the same are rigidly secured by means of clevices or clamps 21 to a cross-pin 22 carried by a drum 23. This drum is rotatably mounted on a supporting shaft 24 received in bearing clamps 25 rigidly connected to the walls of the housing 19. One end of the drum has rigidly connected thereto for rotation therewith, a ratchet wheel 26.

When the doors 14 and 15 are in their open position and the drum is caused to rotate in a counterclockwise direction (referring to Figures 3 to 7 inclusive), the cables 17 will be wound upon the drum and the doors will be forcibly carried to their closed position.

The means for bringing about the rotation of the drum in the desired direction and at the desired time includes a crank-arm 27 having an anti-friction roller 28, which is normally adapted to bear against the periphery of the cam 13. This crank 27 is rigidly secured to a rock shaft 29 rotatably supported in suitable bearings carried by the housing 19.

An intermediate portion of the rock shaft 29 has rigidly secured thereto an operating crank 30. The operating crank 30 is connected through the medium of a spring tension load device 31 with the main operating lever 32. This main operating lever 32 includes spaced side arms 33 connected together by front and rear plates 34.

The side plates have formed on their inner ends hub portions 35, which are rotatably mounted upon the cross-shaft 24 which supports the drum 23. One side plate 33 has formed on its hub a radially extending arm 36, to which is firmly bolted or riveted a counter-weight 37. The arm 36 extends at an obtuse angle to its side plate.

The other side plate has formed on its hub 35 a notch 38, which defines end stop shoulders 39 and 40 for a pin 41 carried by a collar 42 rotatably mounted on the shaft 24. This collar is confined between the side plates 33 of the main operating lever and has formed in its periphery a notch 43, the purpose of which will be later set forth.

Formed on the front or outer plate or web 34 is a boss 44 and depending wings 45. The wings 45 carry a cross-pin 46, to which is coupled the spring tensioned load device 31, which will now be described in detail.

The spring tensioned load device 31 comprises an elongated, inverted U-shaped yoke 47, the lower ends of which are directly coupled by means of a pivot pin 48 to the outer end of the crank-lever 30. The upper cross-bar of the yoke 47 slidably receives the spring rod 49, around which is coiled a predetermined tensioned load spring 50. The upper end of the spring 50 rests against the top cross-bar of the yoke, and the lower end of the spring rests against the rod-carried spring-supporting collar 51. The upper end of the rod has threaded thereon a stop nut 52, which normally bears against the said top bar of the yoke 47. Above the stop nut 52, the rod adjustably carries the head 53, which is coupled to the cross-pin 46 heretofore mentioned.

The main operating lever 32 adjacent to its upper end, carries a cross-shaft 54, which is rigidly connected to the side walls 33 thereof. Rockably mounted on one end of the cross-shaft 54 is the operating dog 55, which is adapted to engage the teeth of the ratchet wheel 26, in order to bring about the movement of the ratchet wheel and the drum 23, so as to wind up a cable 17 thereon.

The operating dog 55, above its pivot point 54, has bolted thereto a leaf spring 56, and this leaf spring extends transversely across the mechanism and above the operating lever 32. Rockably mounted on the same cross-shaft 54 is the swinging latch-out lever 57. This lever is of a substantially bell crank shape and includes a relatively long arm 58 and a relatively short angularly extending arm 59.

The lever intermediate the arms 58 and 59, is provided with spaced lugs 60 between which is received the leaf spring 56. The lugs 60 can carry adjustable set screws 61 for engaging the leaf spring, and obviously these set screws can be moved in and out to vary their time of contact with the leaf spring.

The long arm 58 of the lever 57 carries a substantially cylindrical shaped pin 62, which is adapted to be received within the notch 43 of the return spring collar 42. The outer end of the arm 59 of the lever 57 carries a laterally extending lug 63, for a purpose which will be later set forth. By referring to Figures 4 to 7 inclusive, it can be seen that the latch-out lever 57 is mounted between the walls 33 of the main operating lever 32.

From the description so far, it can be seen that when the doors 14 and 15 are in their open position, and the operating crank-arm 27 is in engagement with the operating cam wheel 13, and the vehicle starts to travel in either direction, the cam will operate the lever 27 and consequently rock the shaft 29 and bring about the oscillation of the crank-arm 30.

Due to the fact that the crank-arm 30 is connected to the spring load device 31, this device will be reciprocated up and down. The spring 50 is tensioned to carry a predetermined load, and hence during normal operation of the device the spring will not give, and thus a direct pull and thrust will be exerted on the main operating lever 32.

When the crank-arm 30 is moving down, the spring load device will pull down on the main lever 32, swinging the lever about its supporting shaft 24. As the dog 55 is carried by the lever through the medium of the cross-shaft 54, the dog will be swung with the lever, and consequently bring about the turning of the ratchet wheel and the drum.

When the lever 32 moves in its counter-clockwise direction, the latch-out lever 57 engages the spring 56 and consequently exerts a resilient tension on the dog. Upon the upstroke of the crank 30, the spring load device 31 will move the operating lever 32 back to its normal position in a clockwise direction, and the dog 55 will ratchet over the teeth of the ratchet wheel, imparting no movement to the ratchet wheel or drum.

During the backward movement of the lever 32, the latch-out lever 57 tends to rock in the opposite direction, and thus the other lug 60 engages the other side of the spring 56 to lift up on said dog.

During retrograde movement of the lever 32 and its dog 55, the drum is held against backward movement by a holding pawl 64. This holding pawl 64 is rockably mounted intermediate its ends on a pivot pin 65, which is in turn supported by the pawl-carrier 66. The pawl-carrier 66 is rockably mounted at its upper inner corner upon a supporting rod 67, and the carrier is normally held in a lowered position by means of a contractile coil spring 68. This spring has one end connected to the carrier and its opposite end secured to the housing 19 at the desired point.

The pawl 64 is normally held in its lowered position in contact with the ratchet wheel 26 by means of a contractile coil spring 69, and this spring has one end connected to the pawl above its pivot and to the pawl-carrier 66.

When it is desired to release the drum, for a purpose which will be later set forth, the carrier 66 can be moved to a raised position against the tension of its spring 68, so as to carry the pawl 64 above the ratchet wheel. This means consists of a pull chain 70, which has one end firmly anchored to the pawl-carrier 66. The pull chain or cable 70 is led to a convenient point within reach of the operator, so that the same can be readily manipulated, and obviously the chain or cable is trained over suitable guide pulleys 71.

After the doors 14 and 15 have been moved to their closed position, it is necessary and desirable to discontinue the movement of the drum 23, and this is accomplished through the medium of the spring load device 31.

Obviously, when the doors are closed, the cables 17 will become taut, and consequently when the spring load device 31 tends to move downwardly by the crank-arm 30, the stress will exceed the predetermined tension of the spring 50, and the yoke 47 pulling down on the upper end of the spring 50, will compress the spring, allowing said yoke to move downwardly.

The upper end of the yoke 47 carries an upstanding keeper nose 72. This nose can be adjustably mounted on the yoke, so that the nose can be set at the desired elevated position, best suited for the working of the device. This keeper nose 72 functions in connection with a latch lever 73. This lever is pivotally connected at its upper end on a pivot pin 74 carried by the laterally extending ear 75 formed on the intermediate lever 76. This intermediate lever 76 is of an inverted U-shape and is rockably mounted intermediate its ends on a pivot pin 77 carried by the bearing boss 44 formed on the main operating lever 32. The lower end of the latch lever 73 has formed therein a shoulder 78, which is adapted to engage the keeper nose 72 when the spring load yoke 47 moves downwardly.

Obviously, when the spring load yoke 47 moves downwardly, the lower end of the lever rocks and moves downwardly by gravity and the shoulder will ride over said nose. The outer face of the latch lever 73 carries a laterally extending arm 79, for a purpose which will be later set forth.

Again referring to the intermediate lever 76, which, as stated, is rockably carried by the main operating lever 32, it will be noted that the same carries a cross-pin 81, which is disposed above the plate carrying the bearing boss 44 and wings 45 of the operating lever, and this pin 81 is disposed in the path of the laterally extending lug 63 formed on the latch-out lever 57, which is also carried by the main operating lever.

As heretofore stated, the return spring collar 42 for the wind-up carries a pivot pin 41, which is confined between the shoulders 39 and 40 on the hub 35 of the main operating lever, and this pin rockably carries the semi-circular link 82, which has connected to its lower end the coil spring 83. The lower end of the coil spring is firmly secured to an appropriate point of the housing 19, and normally exerts a rotative pull on the collar 42 in a clockwise direction, and thus tends to hold the latch-out lever in the position shown in Figure 4 for holding the dog 55 in engagement with the ratchet wheel.

Considering that the spring load device has been pulled down, the doors have been closed, the force has passed the set load of the spring 50, and the latch lever 73 has swung into engagement with the nose 72, then on upward movement of the spring load device, a direct thrust will be exerted through the yoke 47, nose 72, latch lever 73, on the intermediate lever 76, which will bring about the rocking thereof and will also bring its pin 81 in contact with the arm 63, rocking the latch-out lever 57 on its pivot 54, which will carry the lug 60 on the left-hand side into engagement with the spring 56, moving the pawl 55 to an elevated position.

Figure 7:
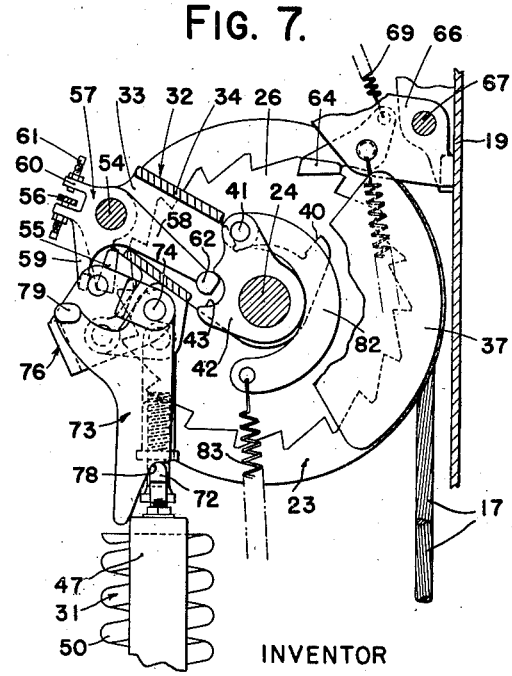
Figure 7 is a view similar to Figure 6, showing the position of the parts after the doors have been moved to their closed position and the operating pawl has been lifted to its inoperative position.

Upon the next downward stroke of the spring load device 31, the lever 32 will be rotated in a counter-clockwise direction in the ordinary manner, and as the dog has been lifted, no movement will be imparted to the drum. The collar 42 will be rotated with the lever, and consequently the semi-circular link 82 will be carried therewith, increasing the tension of the coil spring 83. As the pivot pin 41 of the link 82 rides over the center of the main shaft 24, as shown in Figure 7, the tension of the spring pulls down on the collar 42 on the left-hand side of the shaft, which moves the pin 41 away from the shoulder 40, and into sharp contact with the shoulder 39 of the main lever, causing an increased downward movement of the main lever.

As the length of the spring load device has already been increased due to the engagement of the latch 73 of the nose 72, the crank 30 will be moved down a relatively great distance and below its normal position, causing the lifting of the crank-arm 27 and its roller 28 above the periphery of the cam, so that continued rotation of the cam will not actuate the crank 27 or any of the parts of the device.

The parts are held in this position by the spring 83 until the parts are manually re-set by a mechanism which will be later described.

Presuming that the vehicle has received another load and the load is to be dumped, then the pawl carrier 66 is moved up by the pull cable 70, as heretofore described. The drum is now free to rotate and the doors will swing open under the weight of the carried load.

In order to bring about the re-setting of the mechanism, I employ a so-called starting lever 84. This starting lever 84 is also rotatably mounted on the main shaft 24 and has formed thereon a pull arm 85, to which is connected a pull chain 86. This pull chain 86 is trained over suitable guide pulleys 87 and is led alongside the pull chain or cable 70 to a point convenient to the driver for operation. On one side of the pull arm 85, the lever has formed thereon a latch operating arm 87, and on the other side of the arm 85, a shoulder 88. The latch operating arm 87 carries a laterally extending lug 89.

Upon pull being exerted on the cable 86, the lever 84 will be rocked in a clockwise direction, carrying the arm 87 toward the upper end of the latch lever 73, and the lug 89 of the arm 87 will strike the arm 79 on the latch lever 73, causing the movement of the latch lever away from the nose 72, so that the spring load device can resume its normal position.

As the re-set or starting lever 84 rotates, the shoulder 88 will engage the counter-weight 37 on the main operating lever and return the main operating lever to its normal position, and as the intermediate lever 76 will be returned to its normal position, the dog 55 will again move into engagement with the ratchet wheel. Thus, the device is again ready for operation.

The re-set or starting lever 84 is held in its normal position by a contractile coil spring 90, and it is to be noted that this spring is connected to said lever 84 and to an appropriate place on the housing 19. To hold the lever against swinging movement to a too far depressed position, the lever has formed thereon a laterally extending lug 91, which is adapted to abut against a part of the housing 19.

From the foregoing description, it can be seen that I have provided a novel mechanism for automatically closing the doors of a dump vehicle after the load has been dumped and by the travel of the vehicle.

Changes in details may be made without departing from the spirit or the scope of my invention, but what I claim as new is:

1. In a dump vehicle including a body having a hinged door, means for automatically closing said door by the travel of a vehicle including a wheel-operated cam and a crank-lever actuated by said cam, and means for moving the crank-lever out of engagement with said cam incident to stoppage of closing movement of the door.

2. In a dump vehicle including a body having a hinged door, means for automatically closing said door by the travel of a vehicle including a wheel-operated cam and a crank-lever actuated by said cam, means for automatically moving the crank-lever out of engagement with said cam when the doors have been moved to a fully closed position, and manual means for returning the crank-arm to its normal position when it is again desired to close the door after opening.

3. In a dump vehicle, a body having a dumping door, a cable for closing said door when a pull is exerted thereon, a drum for winding up said cable for exerting said pull, a rotatable cam operable during movement of the vehicle, a rock shaft, a crank-arm on said rock shaft engaging the cam for actuating the rock shaft during rotation of the cam, means operably connecting the rock shaft with the drum for rotating said drum in a step by step movement, and means operable by and incident to the stoppage of the door for raising the crank-arm out of engagement with the periphery of the cam after the cable has been fully wound upon said drum.

4. In a dump vehicle, a body having a dumping door, a cable for closing said door when a pull is exerted thereon, a drum for winding up said cable for exerting said pull, a rotatable cam operable during movement of the vehicle, a rock shaft, a crank-arm on said rock shaft engaging the cam for actuating the rock shaft during rotation of the cam, means operably connecting the rock shaft with the drum for rotating said drum in a step by step movement, means for raising the crank-arm out of engagement with the periphery of the cam after the cable has been fully wound upon said drum, the operation of said means being initiated by the closing movement of the doors, and means for returning said arm into engagement with the cam.

5. In a dump vehicle, a vehicle body having a dump door, a cable for closing said door when a pull is exerted thereon, a drum for winding up said cable to exert said pull, a rock shaft, a rotatable cam operable upon traveling movement of the vehicle, a crank-arm on said rock shaft normally engaging the periphery of the cam, an operating lever, a dog carried by said lever, a ratchet wheel operatively connected to the drum normally engaged by said dog, a spring load device operatively connecting the rock shaft with the operating lever, and means for moving the crank-arm out of engagement with the periphery of the cam when a predetermined tension is exceeded in said spring load device.

6. In a dump vehicle, a vehicle body having a dumping door, a cable for closing said door when pull is exerted thereon, a drum for winding up said cable to exert said pull, a rock shaft, a rotatable cam operable upon traveling movement of the vehicle, a crank-arm connected to said rock shaft normally engaging the periphery of the cam, a ratchet wheel operatively connected to the drum, a rock lever, a pivoted dog carried by said rock lever normally engaging the teeth of the ratchet wheel, a second crank-arm on said rock shaft, a spring load device operatively connecting said second crank-arm with the rock lever, a secondary lever rockably carried by the rock lever, a latch lever pivotally connected to the secondary lever, operable means between the secondary lever and the dog for elevating said dog upon predetermined movement of the latch lever and secondary lever, said spring load device including an inverted U-shaped yoke connected to the second crank-lever, a rod extending through said yoke having a spring support, a spring having a predetermined tension engaging the support at one end and the yoke at the opposite end, the rod being pivotally connected to the rock lever, a keeper nose on said yoke adapted to be engaged by the latch lever when a predetermined pressure is placed upon said spring, and means for bodily moving the rock lever, latch lever, and spring load device to a predetermined lowered position for raising the first crank-lever away from the cam upon downward movement of the rock lever and when the latch lever is in engagement with the keeper.

7. In a dump vehicle, a vehicle body having a dumping door, a cable for closing said door when pull is exerted thereon, a drum for winding up said cable to exert said pull, a rock shaft, a rotatable cam operable upon traveling movement of the vehicle, a crank-arm connected to said rock shaft normally engaging the periphery of the cam, a ratchet wheel operatively connected to the drum, a rock lever, a pivoted dog carried by said rock lever normally engaging the teeth of the ratchet wheel, a second crank-arm on said rock shaft, a spring load device operatively connecting said second crank-arm with the rock lever, a secondary lever rockably carried by the rock lever, a latch lever pivotally connected to the secondary lever, operable means between the secondary lever and the dog for elevating said dog upon predetermined movement of the latch lever and secondary lever, said spring load device including an inverted U-shaped yoke connected to the second crank-lever, a rod extending through said yoke having a spring support, a spring having a predetermined tension engaging the support at one end and the yoke at the opposite end, the rod being pivotally connected to the rock lever, a keeper nose on said yoke adapted to be engaged by the latch lever when a predetermined pressure is placed upon said spring, means for bodily moving the rock lever, latch lever, and spring load device to a predetermined lowered position for raising the first crank-lever away from the cam upon downward movement of the rock lever and when the latch lever is in engagement with the keeper, and manual means for disconnecting the latch lever from the keeper and for returning the rock lever to its normal position.

8. In a dump vehicle, a vehicle body having a dumping door, a cable for closing said door when pull is exerted thereon, a drum for winding up said cable to exert said pull, a rock shaft, a rotatable cam operable upon traveling movement of the vehicle, a crank-arm connected to said rock shaft normally engaging the periphery of the cam, a ratchet wheel operatively connected to the drum, a rock lever, a pivoted dog carried by said rock lever normally engaging the teeth of the ratchet wheel, a second crank-arm on said rock shaft, a spring load device operatively connecting said second crank-arm with the rock lever, a secondary lever rockably carried by the rock lever, a latch lever pivotally connected to the secondary lever, operable means between the secondary lever and the dog for elevating said dog upon predetermined movement of the latch lever and secondary lever, said spring load device including an inverted U-shaped yoke connected to the second crank-lever, a rod extending through said yoke having a spring support, a spring having a predetermined tension engaging the support at one end and the yoke at the opposite end, the rod being pivotally connected to the rock lever, a keeper nose on said yoke adapted to be engaged by the latch lever when a predetermined pressure is placed upon said spring, means for bodily moving the rock lever, latch lever, and spring load device to a predetermined lowered position for raising the first crank-lever away from the cam upon downward movement of the rock lever and when the latch lever is in engagement with the keeper, manual means for disconnecting the latch lever from the keeper and for returning the rock lever to its normal position, means for preventing retrograde movement of the drum, and manually operable means for rendering said last named means inactive.

9. In a dump vehicle, a dump body having a dump door, a cable for closing said door when pull is exerted thereon, a drum for winding up said cable to exert said pull, a ratchet wheel rigidly connected with the drum, a main operating lever, a pivoted dog carried by said lever for engaging the teeth of the ratchet wheel, a second dog for preventing retrograde movement of the drum, a rotatable cam operable upon the travel of the vehicle, a crank-arm normally engaging the periphery of the cam, a spring load device operatively connected to the crank and to the operating lever, means for moving the crank-arm out of engagement with the cam when a predetermined tension is reached in said spring load device, and manual means for moving the second mentioned dog out of engagement with the ratchet wheel.

10. In a dump vehicle, a dump body having a dump door, a cable for closing said door when pull is exerted thereon, a drum for winding up said cable and exerting said pull, a ratchet wheel rigidly secured to the drum, a main operating rocking lever, a pivoted dog carried by said lever for engaging the teeth of the ratchet wheel, a second dog engaging said ratchet wheel for preventing retrograde movement thereof, a rock shaft, a crank-arm secured to said rock shaft, a rotatable cam operable upon travel of the vehicle for operating said crank-arm, a second crank-arm on the rock shaft, a spring load device adapted to give when a predetermined tension is reached including an inverted U-shaped yoke, a rod slidable through said yoke having a spring support, a spring engaging said support and yoke, means connecting the yoke with the second named crank-arm, means pivotally connecting the rod to the main operating lever, an intermediate lever rockably mounted on the main lever, a latch lever pivotally connected to said intermediate lever, a latch keeper on the yoke adapted to be engaged by the latch lever when a predetermined tension is exceeded in the spring and when the rod and yoke move in opposite directions relative to one another, a rock collar, a latch-out lever rockably mounted on the main lever and above said collar having operative connection with said collar, means for actuating the first mentioned dog from said latch-out lever, means for actuating the latch-out lever from the intermediate lever when the latch lever is in engagement with its keeper, a semi-circular link pivotally connected to said collar, a spring connected to said link for rotating said collar and main lever when the collar has been moved to a predetermined position, and manually actuated means for disconnecting the latch lever from its keeper and for returning the operating lever to its normal position.

11. In a dump vehicle including a body, a pair of dump doors hingedly connected to the body at their outer longitudinal edges, guide pulleys carried by the inner longitudinal edges of the door, a pair of pull cables anchored at their forward terminals to the body and trained over said pulleys, a drum for winding up said cables for closing said doors, a rock shaft, a vehicle-operated cam, a crank-arm on said rock shaft normally engaging the cam, means for automatically operating the drum from said rock shaft, incident to closing movement of the doors and means for moving the lever out of engagement with the cam when the cables have been fully wound on said drum.

12. In combination, a dumping vehicle body comprising a dumping door, wheel means supporting the body, door closing mechanism including a drum and cable means adapted to wind on the drum and connected to the door, instrumentalities operable by the wheel means for actuating said drum to wind the cable thereon and including an extensible resilient actuating connection, said connection comprising shiftable parts movable relative to each other upon extension of the connection for automatically effecting discontinuance of the door closing movement by the closing mechanism when said door is arrested from further progress during its closing movement.

13. Door closing mechanism as claimed in claim 12, wherein the door closing mechanism includes pawl and ratchet means connected to the resilient connection and shiftable thereby upon extension of the connection to disengage the pawl and ratchet to discontinue the closing movement of the door and upon contraction to condition the pawl and ratchet for effecting closing movement of the door.

14. In combination, a dumping vehicle body comprising a dumping door, wheel means supporting the body, door closing mechanism including a drum and cable means adapted to wind on the drum and connected to the door, instrumentalities operable by the wheel means for actuating said drum to wind the cable thereon and including an automatically acting contractible and extensible actuating connection for operating said drum comprising means for maintaining the connection normally contracted while the door is in closed position, and mechanism operable to cause extension of said connection for rendering the door closing means inoperative to wind the cable means on the drum.

15. In combination, a dumping vehicle comprising a dumping door, a movable part carried by the vehicle and constituting a driving member operating during movement of the vehicle, door closing mechanism on the vehicle, connecting means between the movable part and said door closing mechanism comprising an actuating part normally out of driving relation to said driving member when the door is closed and also comprising an extensible connection operable to move said actuating part into a position to be operated by the driving member, manual means cooperating with said extensible connection to adjust same so that said actuating part is caused to be operated by the driving member, said connection being extensible responsive to interruption in the closing movement of the door and including a part shiftable upon such extension to hold the said connection in extended condition and thereby to move the actuating part out of driving relation to the driving member.

16. In a dumping vehicle, a dumping door, door closing mechanism including a winding device and cable adapted to wind thereon, detent means engaging the winding device and operable to release the latter for door opening movement, operating means for the winding device comprising drive mechanism operated by movement of the vehicle and including a reciprocating connection for actuating the winding device incident to reciprocation, said connection being adjustable to render the driving mechanism inoperable by movement of the vehicle and to render said driving mechanism operative by such movement, a kick-off dog in said connection operable upon interruption of closing movement of the door to condition the same for preventing operation of the driving mechanism by movement of the vehicle, and operating means for effecting actuation of the detent means to release the door for door opening movement and for actuating the kick-off dog for conditioning the reciprocating connection to cause actuation of the winding device by the driving mechanism to effect door closing movement.

17. Means as claimed in claim 16, wherein the reciprocating connection comprises relatively movable reach rod and yoke parts, and a spring interposed between said reach rod and yoke parts for maintaining the same in predetermined relative positions under conditions of service.

RALPH T. OSMAN.